US 8,536,508 B2

(12) United States Patent
Peters et al.

(10) Patent No.: US 8,536,508 B2
(45) Date of Patent: Sep. 17, 2013

(54) HIGH-PROBABILITY HERALDED SINGLE-PHOTON SOURCE AND RELATED METHOD

(75) Inventors: Nicholas A. Peters, Laurel, MD (US); Thomas E. Chapuran, Hillsborough, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 322 days.

(21) Appl. No.: 12/874,294

(22) Filed: Sep. 2, 2010

(65) Prior Publication Data

US 2011/0211244 A1 Sep. 1, 2011

Related U.S. Application Data

(60) Provisional application No. 61/240,162, filed on Sep. 4, 2009.

(51) Int. Cl.
*H01J 40/14* (2006.01)
*G02B 26/02* (2006.01)
*G06E 3/00* (2006.01)

(52) U.S. Cl.
USPC ...................................... 250/214 R; 359/107

(58) Field of Classification Search
USPC .............................. 250/214 R; 359/107, 108
See application file for complete search history.

(56) References Cited

U.S. PATENT DOCUMENTS

| 7,019,875 | B2 | 3/2006 | Pittman et al. |
| 7,049,574 | B1 | 5/2006 | Takeuchi |
| 7,355,769 | B2 | 4/2008 | Pittman et al. |
| 7,502,476 | B1* | 3/2009 | Trifonov et al. ............... 380/283 |
| 8,270,841 | B2* | 9/2012 | Nishioka et al. ............... 398/140 |
| 2008/0050126 | A1 | 2/2008 | Shapiro et al. |
| 2010/0079833 | A1* | 4/2010 | Langford et al. ............. 359/107 |
| 2011/0211244 | A1* | 9/2011 | Peters et al. ................... 359/227 |

OTHER PUBLICATIONS

A. L. Migdall et al., "Tailoring Single-Photon and Multiphoton Probabilities of a Single-Photon On-Demand Source," Physical Review A, vol. 66, pp. 1-4, Nov. 13, 2002.
B. C. Jacobs et al., "Single Photon Source Using Laser Pulses and Two-Photon Absorption," Physical Review A vol. 74, pp. 1-4, 2006.
P. Kumar et al., "Photonic Technologies for Quantum Information Processing," Quantum Information Processing, vol. 3, Nos. 1-5, pp. 215-231, Oct. 2004.

(Continued)

*Primary Examiner* — John Lee
(74) *Attorney, Agent, or Firm* — Lowenstein Sandler LLP

(57) ABSTRACT

A system and method is provided for a source for a heralded single photon comprising a correlated photon-pair generator that provides bursts of multiple photon pairs that may be odd or even in number of pairs, one of each pair having a first but not a second characteristic and the other of each pair having the second but not the first characteristic; a first optical path for photons of pairs having the first characteristic; a second optical path for photons of pairs having the second characteristic; a two-photon absorber in the first optical path that, for each burst of photons, reduces the number of first characteristic photons in the first path to zero or one, depending on whether the number of photon pairs in the burst is even or odd; a photon detector in the second path having a heralding signal output to indicate when the number of photons in the burst is odd; and an optical switch coupled to the output of the second optical path and connected to operate in response to the heralding signal.

22 Claims, 2 Drawing Sheets

(56) References Cited

OTHER PUBLICATIONS

Patent Cooperation Treaty International Search Report, Oct. 19, 2010.
Pittman, T.B., et al., "Single photons on pseudodemand from stored parametric down-conversion", Physical Review A, The American Physical Society, vol. 66, 2002.
Migdall, A.L., et al., "Tailoring single-photon and multiphoton probabilities of a single-photon on-demand source", Physical Review A, The American Physical Society, vol. 66, 2002.
Jacobs, B.C., et al., "Single Photon Source Using Laser Pulses and Two-Photon Absorption", Physical Review A, The American Physical Society, vol. 74, 2006.
Hong, C.K., et al., "Experimental Realization of a Localized One-Photon States", Physical Review Letters, The American Physical Society, vol. 56, No. 1, Jan. 6, 1986.
Jeffrey, E., et al., "Towards a periodic deterministic source of arbitrary single-photon states", New Journal of Physics, IOP Publishing, vol. 6, Jul. 29, 2004.
Lounis, B., et al., "Single-photon sources", Reports on Progess in Physics, IOP Publishing, vol. 68, Apr. 21, 2005, pp. 1129-1179.

* cited by examiner

HIGH-PROBABILITY HERALDED SINGLE-PHOTON SOURCE AND RELATED METHOD

RELATED APPLICATION

This application claims priority from Provisional Application No. 61/240,162, filed Sep. 4, 2009, the contents of which are hereby incorporated by reference.

BACKGROUND

1. Technical Field

The present invention relates to a nearly deterministic single-photon source that preferably is useful for quantum cryptography (quantum key distribution) and for building optical quantum computers at a scale large enough to represent a major advance over classical computing.

2. Description of the Related Art

Current single-photon sources have serious limitations for use in quantum computing or communications. Ideally, a single-photon source would reliably and repeatedly emit exactly one photon, either at an arbitrarily requested time (on-demand) or at well-defined time intervals (periodic). In practice, currently available sources are effectively non-deterministic. Some emit photons at random times, making it difficult to coordinate the multiple sources required in systems such as quantum logic processors. Sources that can be driven periodically typically produce a random distribution in the number of photons (e.g., zero, one, or more than one) that are emitted in successive pulses.

The probability of single-photon emission in a given clock cycle is often very low, particularly when conventional approaches are used to minimize the probability of multi-photon emission. Multi-photon emission can cause errors in quantum logic gates, or leak information that reduces the security or decreases the throughput on quantum communications links.

SUMMARY

An object of the present invention is to enable a higher photon-pair production probability over previous approaches.

Another object is to reduce the number and complexity of resources required in some prior art approaches, thereby reducing costs.

A further object is to reduce the number of cycles required in some prior art approaches, and to improve the loss characteristics while increasing the output repetition rate by reducing the number of initial laser pump cycles that are wasted creating zero photon events in the weakly pumped method described in the prior approaches.

In summary, the present invention comprises a source for a heralded single photon having a correlated photon-pair generator that provides bursts of multiple photon pairs that may be odd or even in number of pairs, one of each pair having a first but not a second characteristic and the other of each pair having the second but not the first characteristic; a first optical path for photons of the pairs having the first characteristic; a second optical path for photons of the pairs having the second characteristic; a two photon absorber ("TPA") in the first optical path that, for each burst of photons, reduces the number of first characteristic photons in the first path to zero or one, depending on whether the number of photon pairs in the burst is even or odd; a photon detector in the second path having a heralding signal output depending on whether the number of photons in the burst is odd or even. In one embodiment, an optical switch is coupled to the output of the second optical path and connected to operate in response to the heralding signal. The heralding signal output may also be used as a gating signal an any apparatus requiring such a signal.

The photon detector may be a photon number-resolving detector that provides the heralding signal when the number of photons in the first optical pulse for a burst is odd and the optical switch is normally closed except in the presence of a heralding signal. In the alternative, the photon detector may be a photon number-resolving detector that provides the heralding signal when the number of photons in the first optical pulse for a burst is even and the optical switch is normally open except in the presence of a the heralding signal.

Still further, the source may include a second TPA, the second TPA located in the second optical path before the photon detector, and the photon detector is a photon non-number-resolving detector that provides the heralding signal when a photon is output from the second TPA.

In another alternative, the source may comprise at least one of (i) a pulsed parametric down-conversion source or (ii) a chi-3 based four wave mixing source; either of which produces a characteristic by which the photons may separated into two distinguishable modes.

The first and second characteristics may be one of polarization, spatial mode, momentum mode, or frequency characteristics of the photons, and the correlated photon-pair generator may comprise a non-linear medium pumped by a laser such as a parametric down-conversion (PDC) source or a Chi-3 based four wave mixing source that produces one horizontally polarized photon and one vertically polarized photon for each of the plurality of photon pairs.

The photon detector may, for example, comprise one of (i) at least one silicon avalanche photodiode, (ii) indium gallium arsenide avalanche photodiode (iii) a transition edge sensor, (iv) solid state photo multiplier, (v) visible light photon counter, or (vi) superconducting nano wire detector.

When the source includes a second TPA, the photo detector may, for example, comprise at least one (i) at least one silicon avalanche photodiode, (ii) indium gallium arsenide avalanche photodiode (iii) a transition edge sensor, (iv) solid state photo multiplier, (v) visible light photon counter, or (vi) superconducting nano wire detector, and an optical delay may be coupled to the output of the optical switch.

In a different embodiment, a source for a heralded single photon is provided, which comprises a correlated photon-pair generator that provides bursts of multiple photon pairs that may be odd or even in number of pairs, one of each pair having a first but not a second characteristic and the other of each pair having the second but not the first characteristic; a plurality of N first optical paths for photons of the pairs having the first characteristic; a plurality of N second optical paths for photons of the pairs having the second characteristic; a plurality of TPAs, one located in each of the first optical path that, for each burst of photons, reduces the number of first characteristic photons in that first path to zero or one, depending on whether the number of photon pairs in the burst is even or odd; a plurality of photon detectors, one in each second path having a heralding signal output dependant on the odd or even detection. The heralding signal may be used to gate detectors in systems requiring single photons, for example by using the heralding signal to gate an optical switch with N inputs and at least one output, one each coupled to the output of one of the second optical paths and connected to open in response to a corresponding one of the heralding signals to provide one photon at the output.

The present invention may be described as a method of providing a heralded single photon, comprising generating a burst of P pairs of correlated photons, wherein P may be odd or even in number of pairs, one of each pair having a first but not a second characteristic and the other of each pair having the second but not the first characteristic; separating the photons into a first optical path for photons of the pairs having the first characteristic and a second optical path for photons of the pairs having the second characteristic; absorbing two photons P/2 times in the first optical path for each burst of photons, thereby reducing the number of first characteristic photons in the first path to zero or one, depending on whether P is even or odd; providing a heralding signal output to indicate whether the number of photons in the second path for the burst is odd or even. Once again, the heralding signal may be used as a gating signal, for example by operating an optical switch coupled to the output of the second optical path in response to the heralding signal.

In another embodiment, the present invention may be described as a method for a heralded single photon, comprising generating a burst of P pairs of correlated photons, wherein P may be odd or even in number of pairs, one of each pair having a first but not a second characteristic and the other of each pair having the second but not the first characteristic; separating the photons into a plurality of first optical paths for photons of the pairs having the first characteristic and a plurality of second optical paths for photons of the pairs having the second characteristic; absorbing two photons P/2 times in each of the first optical path for each burst of photons, thereby reducing the number of first characteristic photons in each first path to zero or one, depending on whether P is even or odd; providing a heralding signal output for each second path to indicate whether the number of photons in a second path for the burst is odd or even; and operating an optical switch coupled to each of the outputs of the second optical paths in response to the heralding signals.

It is important to understand that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented here. While the techniques and embodiments will primarily be described in the context of the accompanying drawings, those skilled in the art will further appreciate that the techniques and embodiments can also be practiced in other optical and/or electronic devices or systems.

Reference will now be made in detail to exemplary embodiments of the present invention, examples of which are illustrated in the accompanying drawings. Whenever possible, the same reference numbers will be used throughout the drawings to refer to the same or like parts.

The present invention discloses a method of emitting exactly one heralded photon at a time, with a probability of up to roughly 50% per laser pump clock cycle (compared with 25% in at least one prior art approach). Combined with storage loops or other known techniques, this represents a major step towards a deterministic single-photon source for quantum computing or communications. A photon number-resolving detector at one output of a pair-emission source driven to produce multi-photon pair events, heralds the presence of an odd number of photons in the corresponding output, where a WA reduces the number of photons to either zero or one, with comparable probabilities.

In a preferred embodiment, a non-linear medium is operated in a high-pair creation mode so that there are almost never any zero-photon outputs, whereas the previous solutions run the photon-pair resource in a low-pair emission mode to avoid multi-pair emission. As a consequence of the low-pair emission mode, most photon-pair creation attempts in previous solutions will emit zero photons. To have a high probability of creating a photon, many attempts must be made. A greater number of attempts translates into a greater number of storage cycles.

By running the pair creation mechanism of the present invention in a multi-photon regime, each pulse has a roughly 50% chance of containing an odd number of photon pairs and ultimately the odd number of photons in the heralded mode being reduced to a single photon after transmission through the TPA. Given that each pump pulse has a probability of creating a single photon of approximately 50% and that it is known which pulses to keep, a pulse may be made deterministic by employing storage or time- or space-multiplexing methods.

Further, by triggering off an odd (or even)-photon-number multi-photon pulse, the photon-creating pulses will benefit by the conditional control of the prior approaches.

Figure 1:
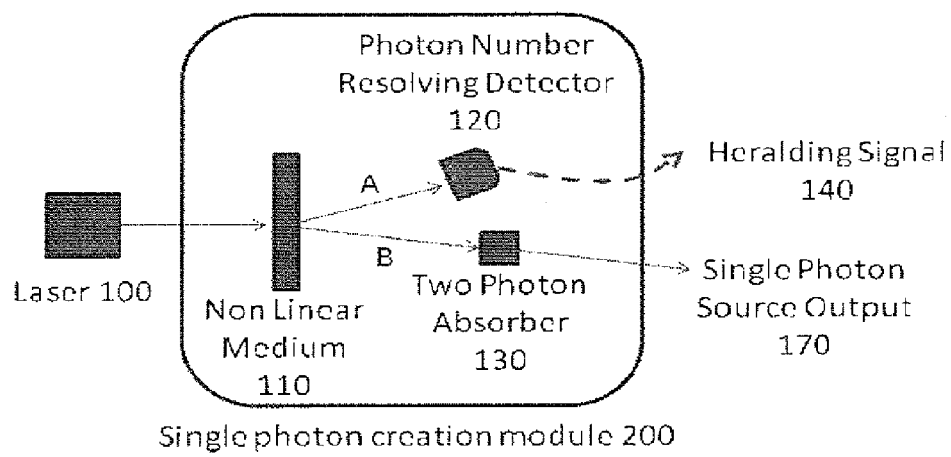
FIG. 1 illustrates a first embodiment of the present invention using a first TPA.

As shown in FIG. 1, a heralded single-photon creation module 200 is pumped by a laser 100. Inside the heralded single-photon creation module 200 is a non-linear medium 110 that produces pairs when pumped by laser 100, such as is the case, for example, by using four-wave mixing or SPDC. The non-linear medium 110 is pumped to produce on average a few photon pairs for every laser pump pulse; thus, on average, three or more photons will exit in each of two modes of the non-linear medium 110.

The photon number of mode A is measured using photon number-resolving detector 120, and due to energy conservation, the photon number in the conjugate mode B is determined. If the photon number is even or zero, no further action is required, as the TPA 130 will reduce this pulse to vacuum. However, if the photon number is odd, then the passage of the conjugate mode's odd-photon-number pulse through the TPA 130 removes photon pairs until only a single photon remains in the pulse at the single-photon source output 170. Detector 120 may, for example, comprises at least one of (i) a silicon avalanche photodiode, (ii) an indium gallium arsenide avalanche photodiode (iii) a transition edge sensor, (iv) a solid state photo multiplier, (v) a visible light photon counter, or (vi) a superconducting nano wire detector.

In this way, a heralded single-photon pulse is produced on average up to every other pump pulse and it does not require an exotic quantum non-demolition measurement of the photon number, as is the case in B. C. Jacobs, T. B. Pittman, and J. D. Franson, "Single-photon source using laser pulses and two-photon absorption," Phys. Rev. A, vol. 74, 010303(R) (2006). Using the single photon and the heralding signal 140, produced on average up to every other clock cycle, the photon may be made periodic following prior art methods, for example, of B. Lounis and M. Orrit, "Single Photon Sources," Reports on Progress in Physics, vol. 68, 1129 (2005); U.S. Pat. No. 7,019,875 to Pittman et al., "Method and apparatus for single-photon source and quantum memory," issued Mar. 28, 2006; T. B. Pittman, B. C. Jacobs, and J. D. Franson, "Single photons on pseudo-demand from stored parametric down-conversion," Phys. Rev. A, vol. 66, 042303 (2002); E. Jeffrey, N. A. Peters, and P. G. Kwiat, "Towards a periodic deterministic source of arbitrary single-photon states," New Journal of Phys., vol. 6, 100 (2004; and/or A. L. Migdall, D. Branning, and S. Castelletto, "Tailoring single-photon and multiphoton probabilities of a single-photon on-demand source," Phys. Rev. A, vol. 66, 053805 (2002), using much less overhead and therefore increasing the efficiency of a periodic single-photon source.

Figure 2:
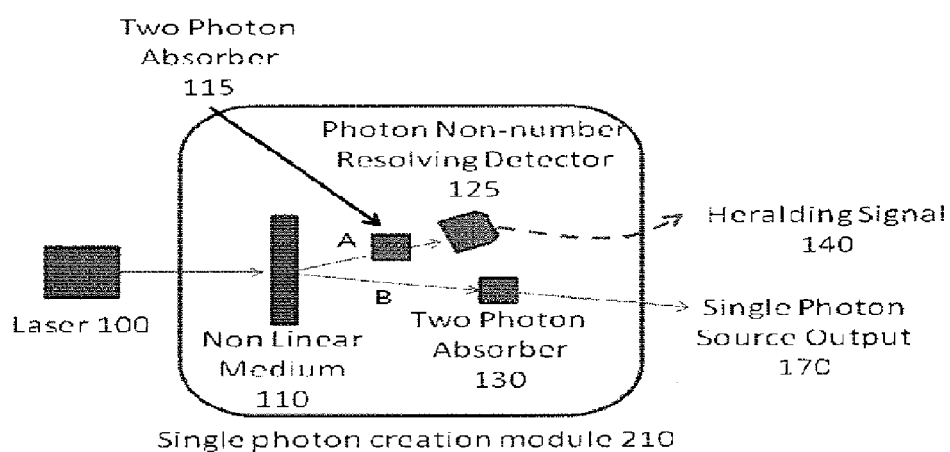
FIG. 2 illustrates another embodiment of the present invention using a first and second TPA.

An alternative embodiment shown in FIG. 2 and labeled single-photon creation module 210, uses an additional TPA 115 followed by a photon non-number-resolving detector 125 in mode A to replace the photon number-resolving detector 120. The additional TPA 115 will subtract pairs of photons from mode A until only a single photon or no photon remains, depending on the initial photon number emitted into mode A from the non-linear medium 110. In this way, the TPA 115 and the photon non-number-resolving detector 125 act as a photon number parity measurement in mode A, which heralds the likely creation of a single photon in mode B, due to the presence of an equal number of photons in mode B as in mode A. Detector 125 may, for example, comprise of at least one of (i) a silicon avalanche photodiode, (ii) an indium gallium arsenide avalanche photodiode (iii) a transition edge sensor, (iv) a solid state photo multiplier, (v) a visible light photon counter, or (vi) a superconducting nano wire detector.

Figure 3:
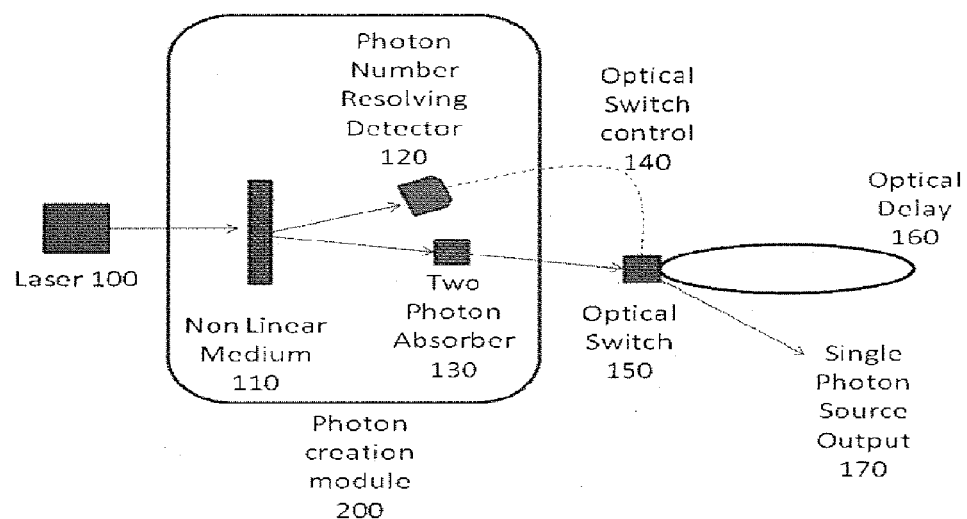
FIG. 3 illustrates still another embodiment of the present invention using a photon storage device.

An additional embodiment of the single-photon source creation module is illustrated in FIG. 3. In principle, either single-photon creation module 200 or 210 can be used, but for the sake of simplicity, only the integration of single-photon creation module 200 is shown.

More specifically, FIG. 3 shows how the single-photon creation module 200 may be integrated into a system to turn the high probability but random output into a periodic output based on known techniques. Once a single photon is heralded by the photon number-resolving detector 120, an optical switch control 140 changes the state of the optical switch 150 to store the photon in an optical delay 160. The single photon is stored in the optical delay 160 for a set number of cycles, depending on when it was switched into the optical delay 160 so that a single photon is emitted with a high probability in a narrow time window at a frequency lower than that of the laser 100.

Figure 4:
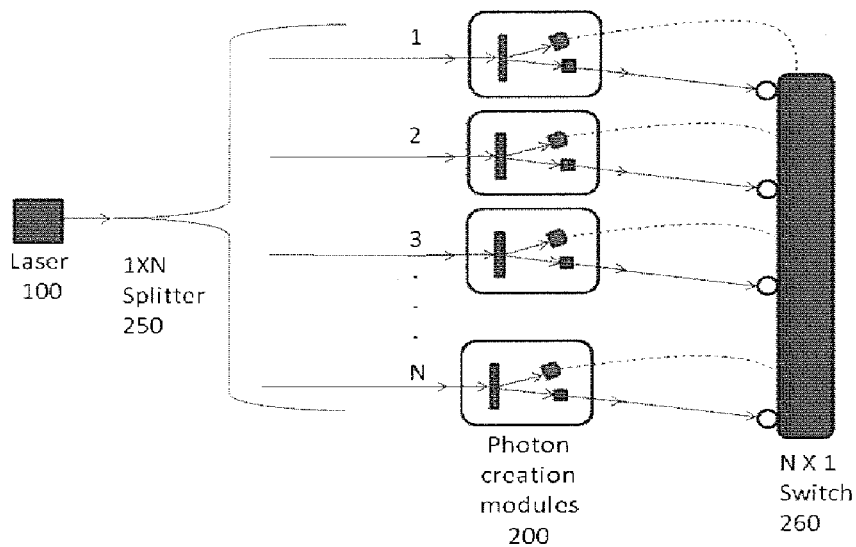
FIG. 4 illustrates a still further embodiment of the present invention using a plurality of heralded photon creation modules.

FIG. 4 shows how the single-photon creation module 200 may be integrated into a system employing 1×N splitter 250 to share the laser pump to multiple single photon creation modules 200 the output of which are combined with an N×1 switch 260 to turn the high probability but random output into a periodic output based on other known techniques. Once a single photon is heralded from any single-photon creation module 200, the state of the N×1 switch 260 is set to transmit only the single photon that has been heralded. If multiple single photons are heralded, only one heralding signal will be sent to the N×1 switch to switch out the corresponding single photon. By using multiple single-photon creation modules 200, at least one will produce a heralded photon on any given laser 100 clock cycle.

When an odd number of photons is detected, the heralding signal is typically in an true state. However, the opposite may also be the case, provided that the optical switch or other gated apparatus is appropriately adjusted. Any apparatus that is usefully operated by the heralding signal should be considered a "gate" for purposes of this invention.

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only with a true scope of the invention being indicated by the following claims.

What is claimed is:

1. A source for a heralded single photon, comprising:
    a correlated photon-pair generator that provides bursts of multiple photon pairs that may be odd or even in number of pairs, one of each pair having a first but not a second characteristic and the other of each pair having the second but not the first characteristic;
    a first optical path for photons of said pairs having the first characteristic;
    a second optical path for photons of said pairs having the second characteristic;
    a two-photon absorber in said first optical path that, for each burst of photons, reduces the number of first characteristic photons in said first path to zero or one, depending on whether the number of photon pairs in said burst is an even or odd number; and
    a photon detector in said second path having a heralding signal output depending on the even/odd characteristic of the number of photon pairs in said burst.

2. The source for a heralded single photon of claim 1, wherein an optical switch in the output of said first optical path is coupled to the output of said second optical path and connected to operate in response to said heralding signal output.

3. The source of claim 2 in which said photon detector in said second path has a heralding signal output upon detection of an odd number of photons in said second path, resulting from an odd number of photon pairs in said burst; and
    said optical switch in the output of said first optical path coupled to the output of said second optical path is normally closed and opens in response to said heralding signal.

4. The source of claim 2 in which said photon detector in said second path has a heralding signal output upon detection of an even number of photons in said second path, resulting from an even number of photon pairs in said burst; and
    said optical switch in the output of said first optical path coupled to the output of said second optical path is normally open and closes in response to said heralding signal.

5. The source of claim 1, wherein said photon detector is a photo number-resolving detector that provides said heralding signal to indicate when the number of photon pairs in said optical pulse for a burst is odd number.

6. The source of claim 1, further including a second two-photon absorber, said second two-photon absorber located in said second optical path before said photon detector which can be a number resolving or a non-number resolving detector, and said photon detector in combination with said second two-photon absorber is a photon parity detector that provides said heralding signal when a photon is output from said second two-photon absorber and measured by said photon parity detector.

7. The source of claim 1, wherein said first and second characteristics are one of polarization, spatial mode, momentum mode or frequency.

8. The source of claim 1, wherein said correlated photon-pair generator comprises a non-linear medium pumped by a laser.

9. The source of claim 1, wherein said correlated photon-pair generator comprises at least one of (i) a pulsed parametric down-conversion source or (ii) a pulsed chi-3 based four wave mixing source, either of which produces a characteristic by which the photons of a pair may separated into two distinguishable modes.

10. The source of claim 1, wherein said photon detector comprises at least one of (i) a silicon avalanche photodiode, (ii) an indium gallium arsenide avalanche photodiode (iii) a transition edge sensor, (iv) a solid state photo multiplier, (v) a visible light photon counter, or (vi) a superconducting nano wire detector.

11. The source of claim 2, further including an optical delay coupled to the output of said optical switch.

12. A source for a heralded single photon, comprising:
a plurality of N correlated photon-pair generators that each provides bursts of multiple photon pairs that may be odd or even in number of pairs, one of each pair having a first but not a second characteristic and the other of each pair having the second but not the first characteristic;
a plurality of N first optical paths, one path for each of said N correlated photon-pair generators, for photons of said photon pairs having the first characteristic;
a plurality of N second optical paths, one path for each of said N correlated photon-pair generators for photons of said photon pairs having the second characteristic;
a plurality of two-photon absorbers, one located in each said first optical path that, for each burst of photons, reduces the number of first characteristic photons in that first path to zero or one, depending on whether the number of photon pairs in said burst is even or odd; and
a plurality of photon detectors, one in each said second path having a heralding signal output that indicates when the number of photon pairs in said burst is an odd number.

13. A source for a heralded single photon of claim 12, further including an optical switch with N inputs and at least one output, one each coupled to the output of one of said second optical paths and connected to open in response to a corresponding one of said heralding signals to provide one photon at said output.

14. A method of providing a heralded single photon, comprising:
generating a burst of P pairs of correlated photons, wherein P may be odd or even in number of pairs, one of each pair having a first but not a second characteristic and the other of each pair having the second but not the first characteristic;

separating said photons into a first optical path for photons of said pairs having the first characteristic and a second optical path for photons of said pairs having the second characteristic;
absorbing two photons P/2 times in said first optical path for each burst of photons, thereby reducing the number of first characteristic photons in said first path to zero or one, depending on whether P is even or odd;
providing a heralding signal output depending on the number of photon pairs in said burst being an odd or even number; and
operating a gate in the output of said first optical path coupled to the output of said second optical path in response to said heralding signal.

15. The method of claim 14, wherein said providing a heralding signal includes using a photon number-resolving detector that provides said heralding signal when the number of photon pairs in said burst is an odd number.

16. The method of claim 14, further including absorbing two photons P/2 times in said second optical path for each burst of photons, thereby reducing the number of second characteristic photons in said second path to zero or one, depending on whether P is even or odd.

17. The method of claim 14, wherein said first and second characteristics are one of polarization, spatial mode, momentum or frequency.

18. The method of claim 14, wherein a non-linear medium pumped by a laser is used to generate said burst of P pairs of correlated photons.

19. The method of claim 14, wherein said burst of P pairs of correlated photons are generated by one of (i) a pulsed parametric down-conversion source and (ii) a Chi-3 based four-wave mixing (FWM) source, either of which produces photon in each pair that are distinguishable by (a) polarization, (b) frequency, (c) momentum mode, or (d) spatial mode.

20. The method of claim 14, wherein at least one (i) silicon avalanche photodiode, (ii) indium gallium arsenide avalanche photodiode (iii) a transition edge sensor, (iv) solid state photo multiplier, (v) visible light photon counter, or (vi) superconducting nano wire detector is used to determine when to generate said heralding signal output.

21. The method of claim 14, further including storing a photon that becomes available upon operation of said optical switch.

22. A method for a heralded single photon, comprising:
generating a burst of P pairs of correlated photons, wherein P may be odd or even in number of pairs, one of each pair having a first but not a second characteristic and the other of each pair having the second but not the first characteristic;
separating said photons into a plurality of first optical paths for photons of said pairs having the first characteristic and a plurality of second optical paths for photons of said pairs having the second characteristic;
absorbing two photons P/2 times in each said first optical path for each burst of photons, thereby reducing the number of first characteristic photons in each first path to zero or one, depending on whether P is even or odd;
providing a heralding signal output for each second path when the number of photon pairs in said burst is an odd number; and
operating a gate in each of the outputs of said first optical paths coupled to each of the outputs of said second optical paths in response to said heralding signals.

* * * * *